United States Patent [19]
Kelly et al.

[11] Patent Number: 5,136,553
[45] Date of Patent: Aug. 4, 1992

[54] METHOD OF GEOPHYSICAL EXPLORATION

[75] Inventors: Michael C. Kelly, Sand Springs; Richard O. Lindsay, Tulsa, both of Okla.

[73] Assignee: Amoco Corporation, Chicago, Ill.

[21] Appl. No.: 629,970

[22] Filed: Dec. 19, 1990

[51] Int. Cl.$^5$ .............................................. G01V 1/36
[52] U.S. Cl. .................................................... 367/52
[58] Field of Search ...................... 367/50, 51, 52, 38; 364/421

[56] References Cited

U.S. PATENT DOCUMENTS

| | | | |
|---|---|---|---|
| 3,735,337 | 5/1973 | Widess | 367/52 |
| 4,849,887 | 7/1989 | Skylas | 364/421 |
| 4,858,202 | 8/1989 | Fitch et al. | 367/52 |

OTHER PUBLICATIONS

Yilmaz, O., "Seismic Data Processing" Investigations in Geophysics No. 2 (SEG, 1987) pp. 154–239.
Yilmaz, O., "Velocity-Stack Processing", Geophysical Prospecting 37 (1989) pp. 357–382.

Primary Examiner—Ian J. Lobo
Attorney, Agent, or Firm—Timothy D. Stanley

[57] ABSTRACT

A method of geophysical exploration is provided for reducing distortion or smearing of reflection event amplitudes in seismic data resulting from residual normal moveout. In particular, the seismic data are sorted into ordered gathers of seismic signals and corresponding reflection events are aligned along hyperbolic loci of traveltimes. The hyperbolically aligned reflection events are then corrected for residual normal moveout by aligning corresponding reflection events along non-hyperbolic loci of traveltimes.

11 Claims, 4 Drawing Sheets

METHOD OF GEOPHYSICAL EXPLORATION

BACKGROUND OF THE INVENTION

The present invention relates generally to the field of geophysical exploration and more particularly to a method for enhancing the interpretability of seismic data by reducing distortion, or smearing, of seismic reflection event amplitudes resulting from residual normal moveout.

In geophysical exploration, normal moveout (NMO) correction of seismic data is generally employed as a precursory step to combining common midpoint (CMP) gathers of seismic signals by summing or stacking. Summing of NMO corrected seismic signals is a powerful technique for suppressing noise in the seismic data. Additionally, summing of NMO corrected seismic signals emphasizes or constructively reinforces the amplitude of corresponding reflection events in the seismic data which are assumed to follow hyperbolic traveltime loci in the CMP gathers of the seismic signals as described generally by Yilmaz in "Seismic Data Processing," *Investigations in Geophysics No.* 2 (SEG, 1987), pgs. 154–239.

If the traveltime loci of corresponding reflection events in a seismic data deviate from hyperbolic traveltimes, the seismic data, after NMO correction, are said to include residual normal moveout which can manifest itself in distorted or smeared reflection event amplitudes in the CMP summed signals. Consequently, reflection events exhibiting non-hyperbolic moveouts, such as those associated with complex structures, will not be properly mapped in velocity space and subsequent inverse mapping to offset space will result in distorted or smeared reflection event amplitudes As such, residual moveout is often characterized as an error in selecting the "proper" stacking velocity.

For low to moderate frequency content seismic data, summation of corresponding reflection event amplitudes in CMP gathers of seismic signals along assumed hyperbolic traveltime loci generally produces acceptable seismic sections for evaluating subsurface structure. However, even small amounts of residual NMO can distort or smear reflection event amplitudes with the most adverse effects manifesting themselves in seismic data having higher frequency contents. This distortion or smearing of reflection event amplitudes can be especially disabilitating to geophysical interpreters in higher frequency content seismic data.

Recently, Yilmaz in "Velocity-Stack Processing," *Geophysical Prospecting* 37 (1989), pgs. 357–382, described a technique to reduce reflection event amplitude smearing or distortion by "stretching" reflection event amplitudes assumed to be along hyperbolic traveltime loci to those along parabolic traveltime loci to obtain better resolution for identifying the "proper" stacking velocity for NMO correction and CMP summing. Nevertheless, such method is still premised upon the theoretical assumption that the loci of two-way traveltimes for corresponding reflection events in a CMP gather of seismic signals are hyperbolic and as such do not directly attempt to correct residual normal moveout resulting from corresponding reflection events following non-hyperbolic loci of traveltimes.

Consequently, as exploration geophysical techniques have evolved toward the collection of higher frequency content seismic data and the use of true amplitude seismic data for both structural and stratigraphic interpretation of the earth's subsurface formations, the need to correct residual NMO distortion or smearing of reflection event amplitudes has become a more significant concern to exploration geophysicists.

SUMMARY OF THE INVENTION

The present invention provides a novel method of geophysical exploration and more particularly a method for enhancing the interpretability of seismic data by reducing distortion or smearing of reflection event amplitudes resulting from residual normal moveout. In particular, corresponding reflection events in ordered gathers of seismic signals are hyperbolically corrected for differences in traveltimes so as to generally flatten and align them. The hyperbolically corrected seismic data are then parabolically corrected for differences in traveltimes so as to generally flatten or align corresponding reflection events therein. In one embodiment of the present invention, the geophysical data are sorted into ordered gathers of seismic signals and a range limited hyperbolic coherency analysis is performed employing selected seismic signals of each ordered gather to determine optimum hyperbolic stacking velocities. Each seismic signal of the ordered gather is corrected with the optimum hyperbolic stacking velocities. A parabolic coherency analysis is performed on the hyperbolically corrected seismic signals to determine optimum parabolic traveltime correction curves to reduce distortion of reflection event amplitudes resulting from residual normal moveout. These and other more fully described benefits and advantages will be provided below in conjunction with the attached drawings.

DETAILED DESCRIPTION OF THE INVENTION

The present invention relates generally to a method of geophysical exploration and more particularly to a method for enhancing the interpretability of seismic data by reducing distortion or smearing of seismic reflection event amplitudes resulting from residual normal moveout.

Figure 1A:
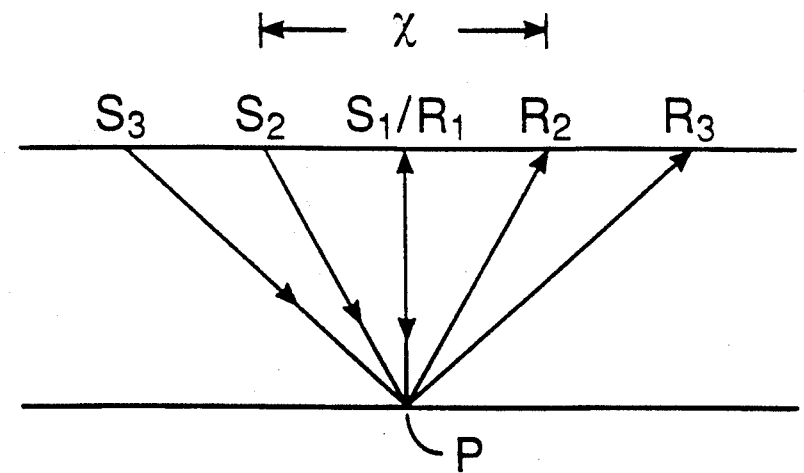
FIGS. 1a and b comprise a schematic representation of a method for collecting a common midpoint (CMP) gather of seismic signals and a result in a common midpoint gather of signals from such CMP collection technique, respectively.
Figure 1B:
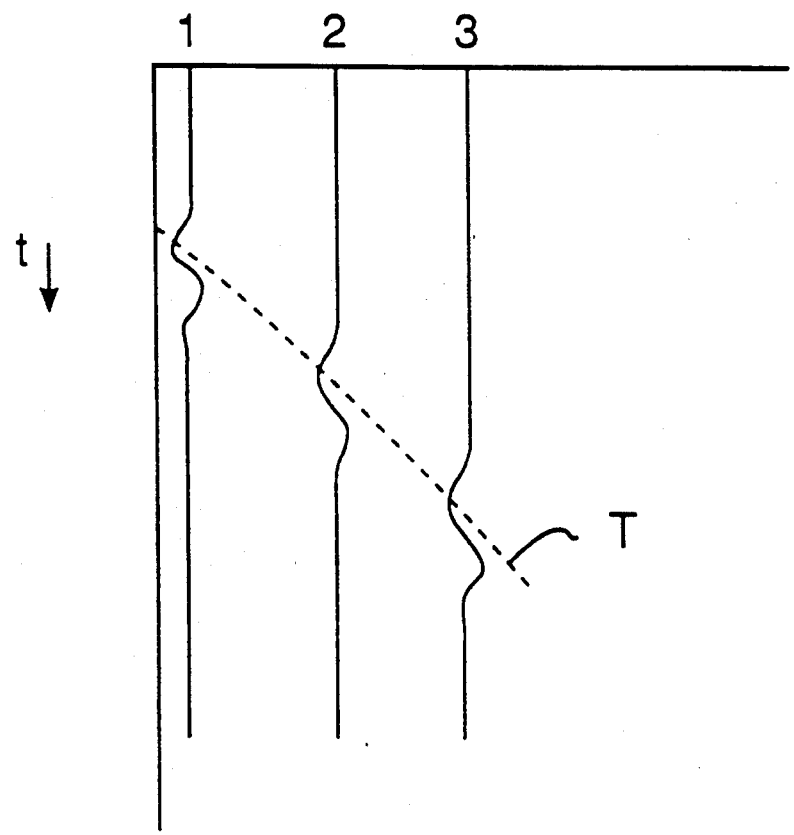

In order to more fully understand the present invention, the following introductory comments are provided. In geophysical exploration, explorationists routinely collect and process seismic data. Typically, the collected seismic data are first sorted into common midpoint (CMP) gathers of seismic signals and the seismic signals are then normal moveout (NMO) corrected to compensate for differences in two-way traveltimes of the imparted seismic energy to a common reflecting point resulting from increasing moveout or separation between sources and receivers. Thereafter, the NMO corrected signals are combined by summing or stacking to produce a stacked signal. However, such processing of CMP gathers of seismic data is predicated on the theoretical assumption that seismic energy imparted into the earth at source locations S1, S2 and S3, reflecting from a common reflecting point P and sensed at recording locations R1, R2, and R3 will follow the travel paths depicted in FIG. 1a. In particular, the two-way traveltimes of the corresponding reflection events in seismic signals 1, 2, 3 of FIG. 1b represent the reflection of the imparted seismic energy from the common point P in FIG. 1a and are assumed to fall along a hyperbolic curve, indicated by dashed line T. From geometric considerations, it can be seen that the two-way traveltime t for seismic energy to propagate along each of the three separate travel paths depicted in FIG. 1a can be approximated according to:

$$t = (t_o^2 + x^2/v^2)^{\frac{1}{2}} \qquad (1)$$

where $t_o$ = normal incident two-way traveltime, i.e., the offset $x=0$;

$x$ = the offset distance or separation between a selected source-receiver pair; and $v$ = velocity of propagation of the imparted seismic energy.

By inspection, one can see that the only unknown term in Eq. (1) is the velocity of propagation of the imparted seismic energy. The velocity of propagation, as used in Eq. (1), is often times referred to as the "stacking" velocity. Several processing schemes have been developed to obtain estimates of the proper velocities to be used in Eq. (1) to correct for differences in two-way traveltimes so that corresponding reflection events in a CMP gather of seismic signals are properly aligned before stacking.

Figure 2:
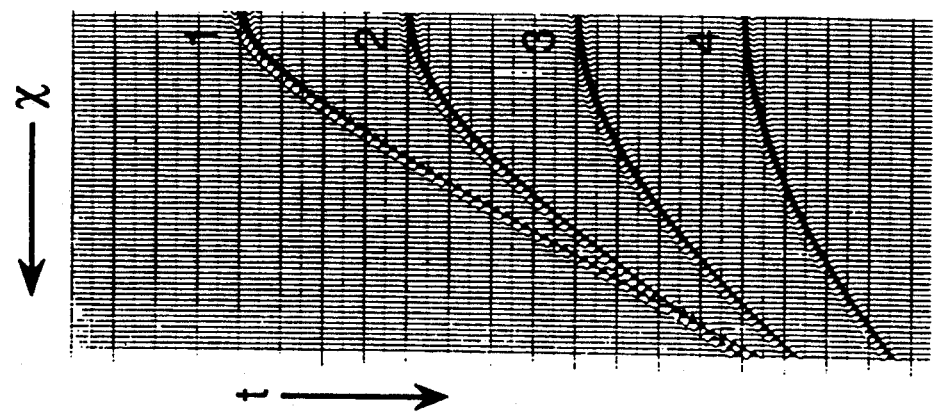
FIGS. 2a, b, and c comprise a CMP gather of synthetic signals having corresponding reflection events 1, 2, 3, and 4 as well as a velocity spectra derived from the CMP gather and a contour plot of the velocity spectra.
Figure 2:
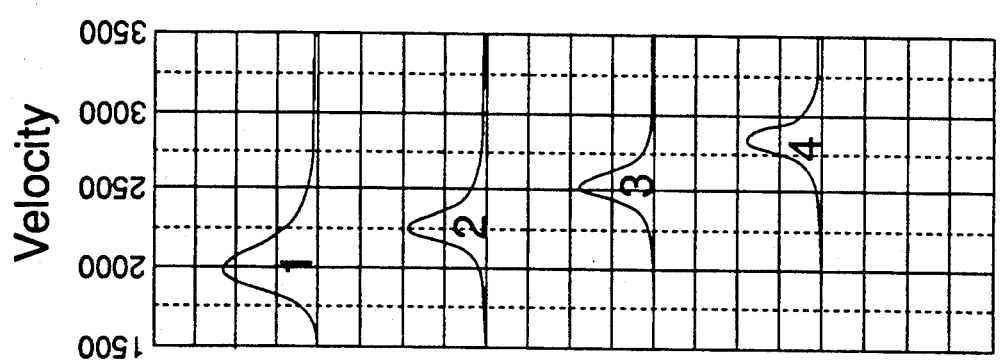
Figure 2:
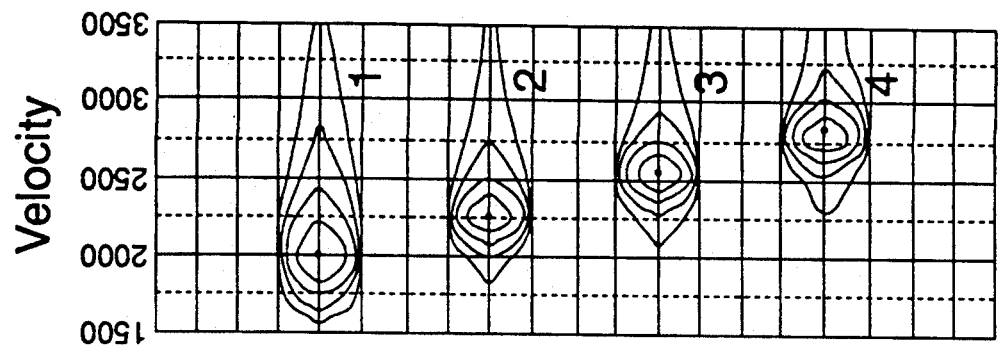
Figure 3:
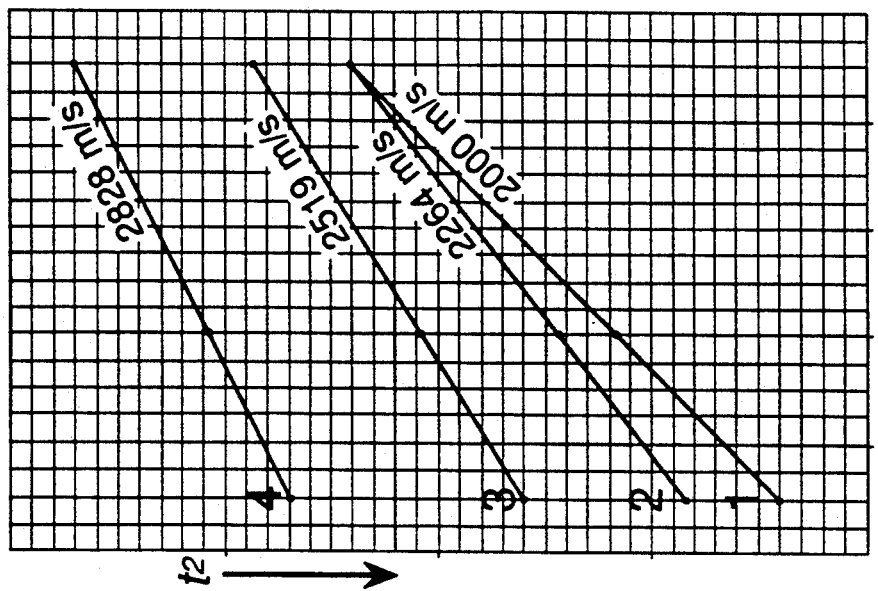
FIGS. 3a, b, and c comprise a CMP gather of synthetic signals having corresponding reflection events 1, 2, 3, and 4 as well as a velocity spectra derived from the CMP gather and a ($t^2 - x^2$) velocity analysis.
Figure 3:
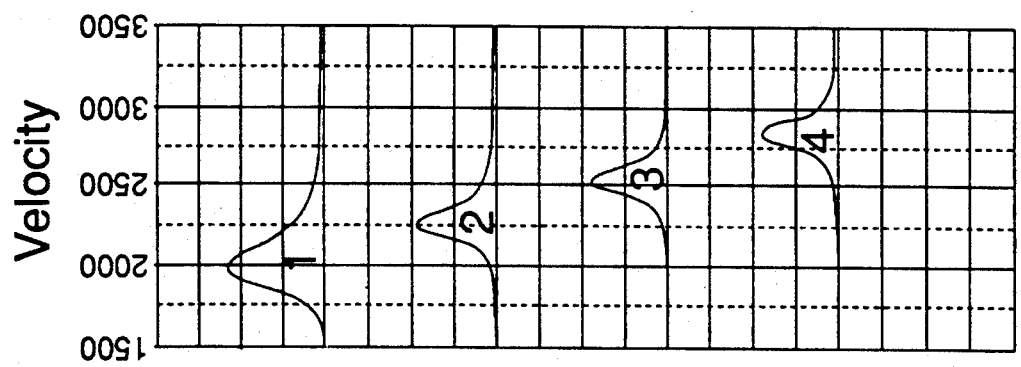
Figure 3:
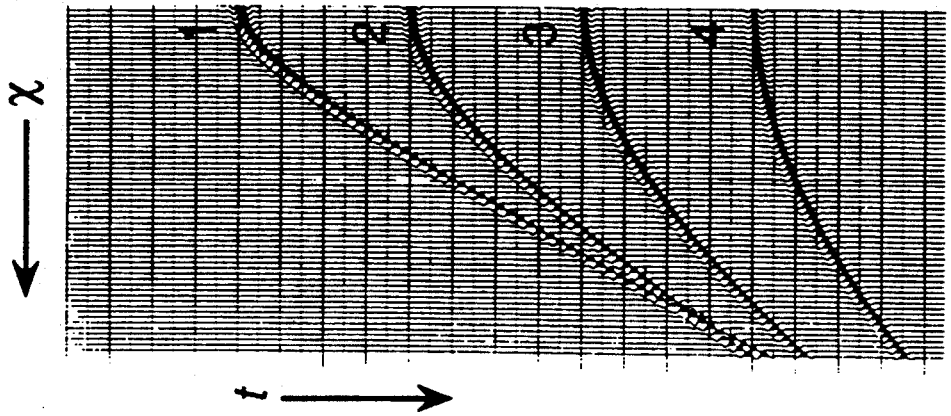

Such processing schemes are conventionally identified as coherency or velocity analysis whereby estimates of the stacking velocity can be obtained. Looking now to FIGS. 2 and 3, several different coherency or velocity analysis schemes will be described. Both FIGS. 2a and 3a represent a CMP gather of synthetic signals having corresponding reflection events 1, 2, 3, and 4 each representative of the reflection of seismic energy from separate layers in a four-layered model of the earth's subsurface. FIGS. 2b and 3b each represent velocity spectra based on Eq. (1) for each corresponding reflection event in FIGS. 2a and 3a.

In particular, the corresponding reflection events (1, 2, 3, 4) in FIGS. 2a and 3a are NMO corrected and stacked using a range of stacking velocities to produce FIGS. 2b and 3b, respectively. The velocity spectra (1, 2, 3, 4) of FIGS. 2b and 3b thus represent the resultant sum of corresponding reflection event amplitudes (1, 2, 3, 4), respectively, for assumed stacking velocities. The largest amplitude associated with each velocity spectrum in FIGS. 2b and 3b is thus related to the stacking velocity which produces the best coherency of corresponding reflection events along an assumed hyperbolic trajectory.

Velocity spectra are not normally depicted as shown in FIGS. 2b or 3b. Instead, contour plots as depicted in FIG. 2c are generally employed whereby a plurality of velocities is employed over a window of traveltimes.

Alternatively, the stacking velocity can be obtained by plotting the spatial and temporal locations of corresponding reflection events on a plot of $t^2$ versus $x^2$, such as in FIG. 3c. As indicated therein, the slopes of curves 1, 2, 3, 4 are inversely related to the stacking velocity for reflection events (1, 2, 3, 4), respectively. Because the coherency technique depicted in FIG. 2c is based on a cross-correlation of reflection events in CMP gathers, and not simply on lateral continuity as in the velocity spectrum technique shown in FIG. 3c, it is more suitable for evaluating seismic data. Moreover, both such coherency or velocity analysis schemes generally assume that the traveltime loci for corresponding reflection events are hyperbolic. Since the corresponding reflection events in the synthetic seismic signals of FIGS. 2a and 3a all follow hyperbolic loci of traveltimes, it can be seen that the velocity or coherency analysis schemes depicted in FIGS. 2b, 3b, 2c and 3d all generate essentially the same stacking velocity estimates.

Unfortunately, many of the assumptions underlying the development of Eq. (1) are not always true and, thus, in the use of the stacking velocities derived from the coherency or velocity analysis schemes previously depicted, can result in distorted or smeared reflection event amplitudes. Most notably, in CMP gathers of seismic signals, the failure of corresponding reflection events to align along hyperbolic loci of traveltimes can result in distortion or smearing of reflection event amplitudes in stacked signals. In such cases, the NMO corrected and stacked seismic data are said to contain residual normal moveout (NMO), i.e., uncorrected differences in two-way traveltimes for corresponding reflection events.

In spite of residual normal moveout, the collection and processing of CMP gathers of seismic data to produce sections of stacked signals have generally yielded many beneficial results. However, as the frequency content of the collected seismic data has increased and as the need to extract stratigraphic information from true amplitude seismic data has developed, the need for more refined processing of seismic data to correct for residual NMO distortion or smearing of reflection event amplitudes has arisen.

Figure 4:
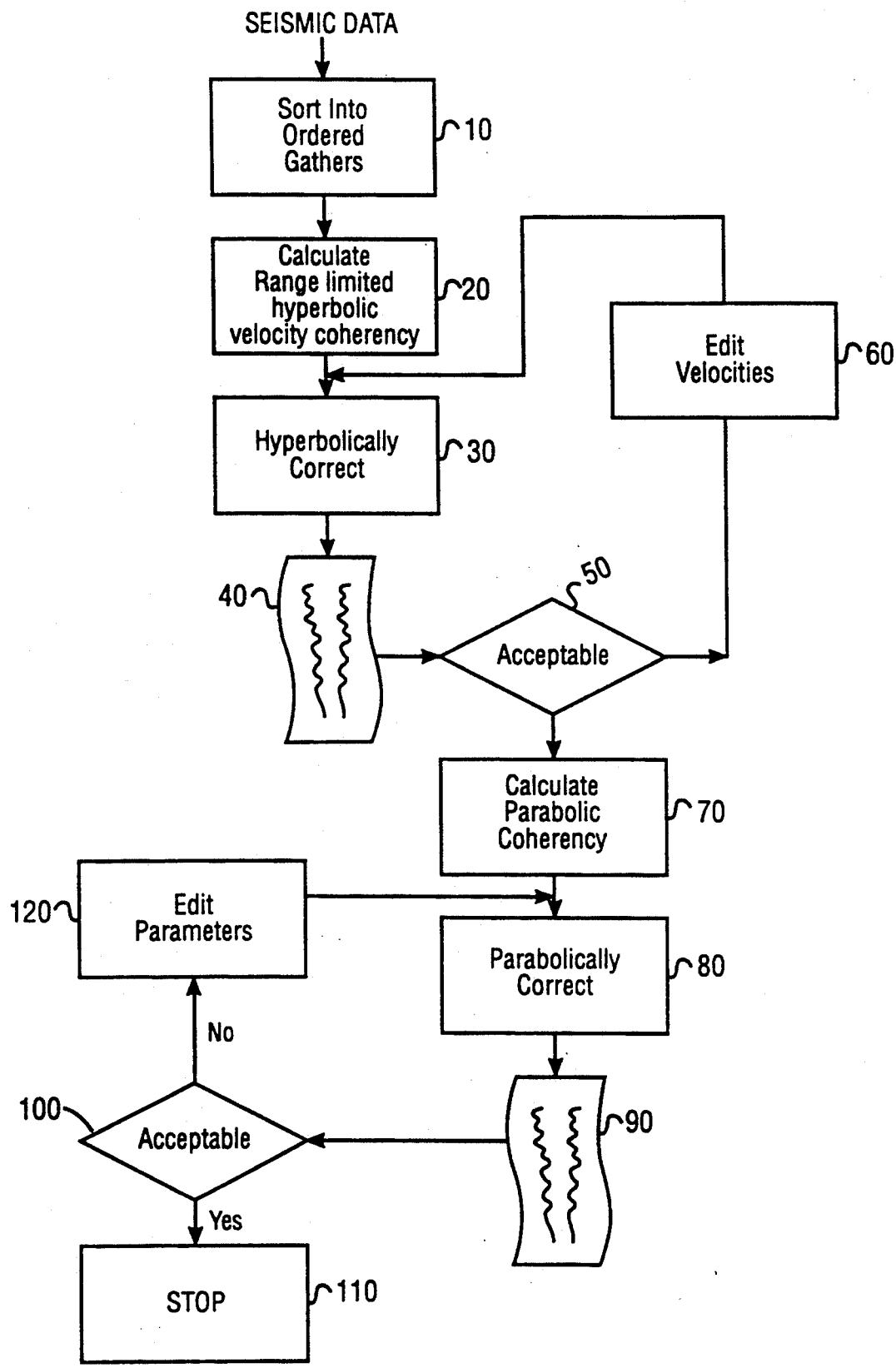
FIG. 4 is a flow diagram of the present invention.

Looking now to FIG. 4, the present invention will be described. At step 10, seismic data are sorted into incident angle ordered gathers of seismic signals (e.g., common end point, common offset, or common midpoint). At step 20, coherency or velocity analyses can be performed to obtain estimates of the stacking velocity to correct for the hyperbolic differences in two-way traveltimes for corresponding reflection events in each ordered gather of seismic signals. Preferably, only those seismic signals having the shortest and longest offsets (i.e., separation distance between source-receiver pairs) are employed unlike conventional coherency or velocity analysis schemes which employ all of the seismic signals in each ordered gather as previously depicted in FIGS. 2 and 3. By convention, such short and long offset signals of a CMP gather are also referred to as near and far offset signals. In one embodiment of the present invention, only the seismic signals associated with the nearest ⅓ and farthest ⅓ offsets in each CMP gather are employed at step 20. As such, the coherency or velocity analysis at step 20 can be considered to be an offset or range limited scheme.

At step 30, the various stacking velocities yielding the highest measures of coherency from step 20 are employed to hyperbolically correct all of the seismic signals in each ordered gather.

A display of the hyperbolically corrected data can be produced at step 40. At step 50, the explorationist can review the hyperbolically corrected seismic data to determine whether or not corresponding reflection events have been adequately horizontally flattened or aligned. If the reflection events are not sufficiently flattened or aligned, the stacking velocities can be edited at step 60 and steps 30-50 can be repeated. If, however, corresponding reflection events have been sufficiently horizontally flattened or aligned with the estimated stacking velocities, new measures of coherency can be calculated at step 70. In particular, corresponding reflection events in each hyperbolically corrected gather of seismic signals are curve fitted to a plurality of parabolic two-way traveltime functions such as:

$$t = C_0 + C_1 x^2 + C_2 x^4 \quad (2)$$

where parameters $C_0$, $C_1$, and $C_2$ are constants, $C_1$ and $C_2$ have opposite signs, and x=offset distance or separation.

Coherency values can be obtained for each suite of parameters ($C_0$, $C_1$, $C_2$) as in conventional coherency or velocity analysis schemes. The suite of parameters ($C_0$, $C_1$, $C_2$) yielding the highest coherency values can then be employed at step 80 to parabolically correct the two-way traveltimes for the hyperbolically corrected seismic data from step 50.

At step 90, displays of the parabolically corrected seismic data can be produced. At step 100, the explorationist can evaluate the parabolically corrected seismic data to determine whether or not corresponding reflection events have been sufficiently horizontally flattened or aligned. If the corresponding reflection events have been sufficiently aligned, residual NMO correction processing is now completed at 110 and the seismic data are then ready for further processing such as combining the seismic signals of each CMP gather to form stacked signals wherein the distortion of smearing of seismic reflection event amplitudes resulting from residual normal moveout has been reduced. If the corresponding reflection events have not been sufficiently aligned, the suite of parameters ($C_0$, $C_1$, $C_2$) can be revised at step 120, and steps 80-100 can be repeated.

While the present invention has been particularly described employing a combination of hyperbolic and parabolic corrections to reduce distortion or smearing of reflection event amplitudes, those skilled in the art will appreciate that higher ordered nonhyperbolic correction curves can also be employed. As such, the present invention is to be limited only by the claims appended herewith.

We claim:

1. A method of reducing distortion of seismic reflection event amplitudes resulting from residual normal moveout, comprising the steps of:
   (a) obtaining measures of coherency for a plurality of assumed hyperbolic normal moveout stacking velocities from corresponding reflection events in ordered gathers of seismic signals;
   (b) aligning corresponding reflection events in each ordered gather of seismic signals with the stacking velocities having optimum measures of coherency;
   (c) obtaining measures of coherency for corresponding reflection events in the hyperbolically corrected gathers of seismic signals for a plurality of parabolic traveltime correction curves; and
   (d) aligning corresponding reflection events in the hyperbolically corrected gathers of seismic signals with the parabolic traveltime correction curves having the optimum measures of coherency for reducing residual normal moveout.

2. The method of claim 1, wherein the step of obtaining measures of coherency comprises obtaining range limited measures of coherency for corresponding reflection events from only selected of the seismic signals in each ordered gather.

3. The method of claim 1, wherein the seismic signals selected in each ordered gather comprise the seismic from the near ⅓ and far ⅓ offsets.

4. The method of claim 1, further including the step of combining the parabolically corrected seismic signals for producing seismic signals having reduced residual normal moveout distortion of reflection event amplitudes.

5. The method of claim 1, further including repeating steps (a) and (b) to optimize the alignment of corresponding reflection events.

6. The method of claim 1, further including repeating steps (c) and (d) to optimize the alignment of corresponding reflection events.

7. The method of claim 1, wherein the measures of coherency in step (a) are obtained employing only near and far offset seismic signals in each ordered gather.

8. The method of claim 1, wherein corresponding reflection events of step (b) are aligned with the selected stacking velocities according to:

$$t = \left[ t_0^2 + \frac{x^2}{v^2} \right]^{\frac{1}{2}}$$

where
t = two-way traveltime
$t_o$ = zero offset two-way traveltime
x = offset
v = stacking velocity 9. The method of claim 1, wherein the ordered gathers comprise incident angle ordered gathers selected for the group including common midpoint, common end point and common offset.

10. The method of claim 1, further including the step of combining the parabolically corrected seismic signal of each ordered gather to produce a stacked signal.

11. The method of claim 1, wherein the parabolic traveltime corrections include:

$$t = C_0 = C_1 x^2 = C_2 x^4$$

where
t = two-way traveltime
x = offset
$C_0$, $C_1$, and $C_2$ are parameters of fit.

* * * * *

UNITED STATES PATENT AND TRADEMARK OFFICE
CERTIFICATE OF CORRECTION

PATENT NO. : 5,136,553
DATED : August 4, 1992
INVENTOR(S) : Michael C. Kelly, et al It is certified that error appears in the above-indentified patent and that said Letters Patent is hereby corrected as shown below:

| Col. | Line | |
|---|---|---|
| 6 | 19-20 | "the seismic from" should read--the seismic signals from-- |

Signed and Sealed this

Fifth Day of October, 1993

*Attest:*

BRUCE LEHMAN

*Attesting Officer*  Commissioner of Patents and Trademarks